US012035248B2

United States Patent
Chopra et al.

(10) Patent No.: US 12,035,248 B2
(45) Date of Patent: *Jul. 9, 2024

(54) POWER CONTROL ENHANCEMENTS FOR MULTI-HOP INTEGRATED ACCESS AND BACKHAUL

(71) Applicant: AT&T Intellectual Property I, L.P., Atlanta, GA (US)

(72) Inventors: Aditya Chopra, Austin, TX (US); Arunabha Ghosh, Austin, TX (US); Thomas Novlan, Austin, TX (US); Andrew Thornburg, Austin, TX (US); Xiaoyi Wang, Austin, TX (US); Ralf Bendlin, Cedar Park, TX (US)

(73) Assignee: AT&T Intellect al P Property I, L.P., Atlanta, GA (US)

( * ) Notice: Subject to any disclaimer, the term of this patent is extended or adjusted under 35 U.S.C. 154(b) by 281 days.

This patent is subject to a terminal disclaimer.

(21) Appl. No.: 17/518,359

(22) Filed: Nov. 3, 2021

(65) Prior Publication Data

US 2022/0060995 A1 Feb. 24, 2022

Related U.S. Application Data

(63) Continuation of application No. 16/052,975, filed on Aug. 2, 2018, now Pat. No. 11,197,246.

(51) Int. Cl.
*H04W 52/22* (2009.01)
*H04W 52/08* (2009.01)
*H04W 52/46* (2009.01)

(52) U.S. Cl.
CPC ......... *H04W 52/228* (2013.01); *H04W 52/08* (2013.01); *H04W 52/46* (2013.01)

(58) Field of Classification Search
CPC ...... H04W 52/08; H04W 52/46; H04W 52/28
See application file for complete search history.

(56) References Cited

U.S. PATENT DOCUMENTS

| 6,236,863 | B1 | 5/2001 | Waldroup et al. |
| 8,677,435 | B2 | 3/2014 | Kfir et al. |

(Continued)

FOREIGN PATENT DOCUMENTS

WO 9936484 A1 12/2013

OTHER PUBLICATIONS

Bulakci, Omer "On Backhauling of Relay Enhanced Networks in LTE-Advanced." arXiv preprint arXiv:1202.0212 (2012). 4 pages.

(Continued)

*Primary Examiner* — James P Duffy

(57) ABSTRACT

Various embodiments disclosed herein provide for a power control system in a multi-hop integrated access and backhaul network. In the multi-hop integrated access and backhaul network, a donor node can communicate with user equipment devices and relay nodes that have varying power levels; and to avoid receiving uplink transmissions with varying power levels which can impact automatic gain control systems and lower overall throughput, the power control system can manage the power levels of the relay node in order to reduce the difference in power levels. The power control system can schedule relay node devices to transmit uplink transmissions alongside user equipment devices that have a high signal strength; schedule relay nodes and user equipment devices to separate symbols within a time slot; and/or perform closed loop power control management at the relay node to reduce the power level for an uplink transmission.

20 Claims, 10 Drawing Sheets

(56) References Cited

U.S. PATENT DOCUMENTS

| | | |
|---|---|---|
| 8,706,026 B2 | 4/2014 | Truong et al. |
| 8,903,412 B2 | 12/2014 | Dayal et al. |
| 9,191,098 B2 | 11/2015 | Kazmi et al. |
| 9,338,753 B2 | 5/2016 | Tang et al. |
| 9,538,514 B2 | 1/2017 | Seo et al. |
| 9,924,439 B2 | 3/2018 | Giloh |
| 9,936,484 B2 | 4/2018 | Zeng et al. |
| 11,197,246 B2 * | 12/2021 | Chopra ............... H04W 52/228 |
| 2002/0046379 A1 * | 4/2002 | Miki ........................ H04L 1/06 714/18 |
| 2006/0239334 A1 | 10/2006 | Kwon et al. |
| 2007/0060185 A1 | 3/2007 | Simon et al. |
| 2010/0105421 A1 | 4/2010 | Wright et al. |
| 2010/0131999 A1 | 5/2010 | Kfir et al. |
| 2010/0144338 A1 | 6/2010 | Kim et al. |
| 2011/0136484 A1 | 6/2011 | Braun et al. |
| 2012/0327794 A1 | 12/2012 | Han et al. |
| 2014/0140235 A1 * | 5/2014 | Park ..................... H04L 5/0073 370/252 |
| 2017/0208574 A1 | 7/2017 | Ramakrishna et al. |
| 2018/0035389 A1 | 2/2018 | Hessler et al. |
| 2018/0192345 A1 | 7/2018 | Yun et al. |

OTHER PUBLICATIONS

Office Action dated Feb. 20, 2020 for U.S. Appl. No. 16/052,975, 40 pages.
Office Action dated Aug. 5, 2020 for U.S. Appl. No. 16/052,975, 30 pages.
Office Action dated Jan. 7, 2021 for U.S. Appl. No. 16/052,975, 36 pages.
Notice of Allowance dated Jul. 30, 2021 for U.S. Appl. No. 16/052,975, 21 pages.

* cited by examiner

POWER CONTROL ENHANCEMENTS FOR MULTI-HOP INTEGRATED ACCESS AND BACKHAUL

RELATED APPLICATION

The subject patent application is a continuation of, and claims priority to, U.S. patent application Ser. No. 16/052,975, filed Aug. 2, 2018, and entitled "POWER CONTROL ENHANCEMENTS FOR MULTI-HOP INTEGRATED ACCESS AND BACKHAUL," the entirety of which application is hereby incorporated by reference herein.

TECHNICAL FIELD

The present application relates generally to the field of mobile communications and more specifically to managing uplink power levels at a relay node in a multi-hop integrated access and backhaul network in a next generation wireless network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
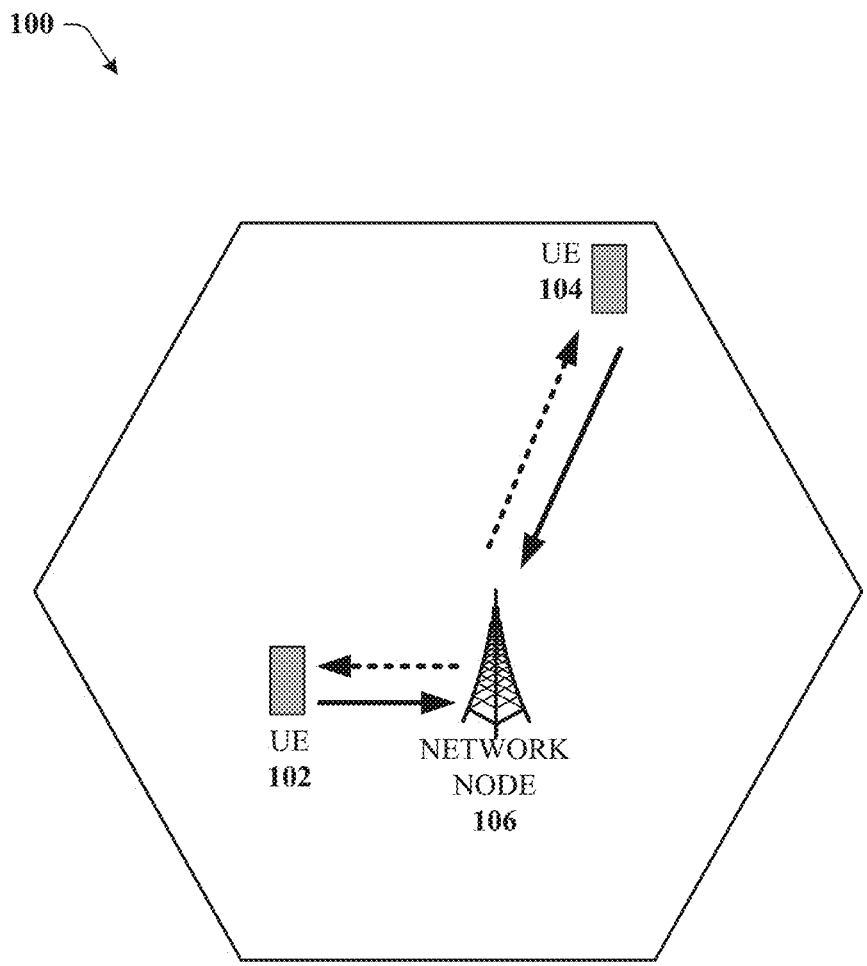
FIG. 1 illustrates an example wireless communication system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for power control system in a multi-hop integrated access and backhaul network. In a multi-hop integrated access and backhaul network a donor node can communicate with user equipment devices and relay nodes that have varying power levels, and to avoid receiving uplink transmissions with varying power levels which can impact automatic gain control systems and lower overall throughput, the power control system disclosed herein can manage the power levels of the relay node in order to reduce the difference in power levels. In one embodiment, the power control system can schedule relay node devices to transmit uplink transmissions alongside UE devices that have a high signal strength. In another embodiment, the power control system can schedule relay nodes and UE devices to separate symbols within a time slot. In another embodiment, the power control system can perform closed loop power control management at the relay node to reduce the power level for the uplink transmission.

In an embodiment, the closed loop power control can be performed via outer-loop power control where the donor node determines a relative difference between signal strengths based on reference signal (e.g., Synchronization Signal Block (SSBlock or Channel State Information Reference Signals (CSI-RS) which are used for both Radio Resource Management (RRM) and beam management measurements). The outer-loop power control includes the donor node informing the relay node of the relative power difference and provides a goal or operating point for the relay node to adjust a power level of the uplink transmission.

In another embodiment, the closed loop power control can be performed via inner-loop power control where the donor node provides further adjustments to the value set by the outer-loop control. Unlike the outer-loop which provides the relative value, the inner-loop power control can be an iterative step up and step down command that iteratively adjusts the power level of the uplink transmission from the relay node. Inner loop power control commands can be sent via the Physical Downlink Control Channel (PDCCH) for fast feedback. In at least one embodiment, the relay can feedback power control steps every slot along with other feedback on PDCCH such as Hybrid Automatic Repeat Request (HARQ) or Negative Acknowledgement (NACK) requests.

In various embodiments, a relay node device can comprise a processor and a memory that stores executable instructions that, when executed by the processor facilitate performance of operations. The operations can comprise determining that a difference, between a first signal strength associated with an access communication link between a donor node device and a first network device and a second signal strength associated with a relay communication link between the donor node device and the relay node device, is larger than a defined signal strength difference. The operations can also comprise selecting a power control mechanism to adjust an operation of the relay node device to reduce the difference between the first signal strength and the second signal strength. The operations can also comprise transmitting an indication of a selection of the power control mechanism to the donor node device.

In another embodiment, method comprises receiving, by a relay node device comprising a processor, a power control indication from a donor node device, wherein the power control indication comprises information relating to a difference between a first signal strength associated with an access communication link between the donor node device and a first user equipment device and a second signal strength associated with a relay communication link between the donor node device and the relay node device. The method can also comprise in response to the difference between the first signal strength and the second signal strength being above a defined difference level, applying, by the relay node device, a power control adjustment to reduce the difference between the first signal strength and the second signal strength. The method can also comprise transmitting, by the relay node device, an indication of the power control adjustment applied by the relay node device to the donor node device.

In another embodiment, a machine-readable storage medium can comprise executable instructions that, when executed by a processor of a device, facilitate performance of operations. The operations can include determining that a difference, between a first power spectral density associated with an access communication link between a donor device and a user equipment device and a second power spectral density associated with a relay communication link between the donor device and a relay device, is larger than a defined power spectral density difference. The operations can comprise selecting a power control mechanism to adjust an operation of the relay node device to reduce the difference between the first power spectral density and the second power spectral density. The operations can also comprise transmitting an indication of a selection of the power control mechanism to the donor node device.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. UE 102 can also refer to any type of wireless device that communicates with a radio network node in a cellular or mobile communication system. Examples of UE 102 are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

In an embodiment, network node 106 can be part of an integrated access and backhaul network where multiple nodes are connected to each other, providing backhaul and access communications to each other, while simultaneously or concurrently being connected to local user equipment (UE) devices (e.g., UE 102 and 104). Due to the relative power level differences between base station devices acting as relay nodes and UE devices, the signal strengths and or power spectral density of transmissions received at the relay node can be very different from each other, thus making it difficult to perform automatic gain control and other signal processing techniques. This is particularly relevant when a relay node or donor node is receiving a backhaul communication from a donor node at the same time as receiving an access link communication from a user equipment device. Since the donor node or receiving node is receiving the communications at the same time, this can apply when the transmissions are multiplexed using frequency division multiplexing or space-division multiplexing and transmissions are not assigned to separate time slots or frames.

Figure 2:
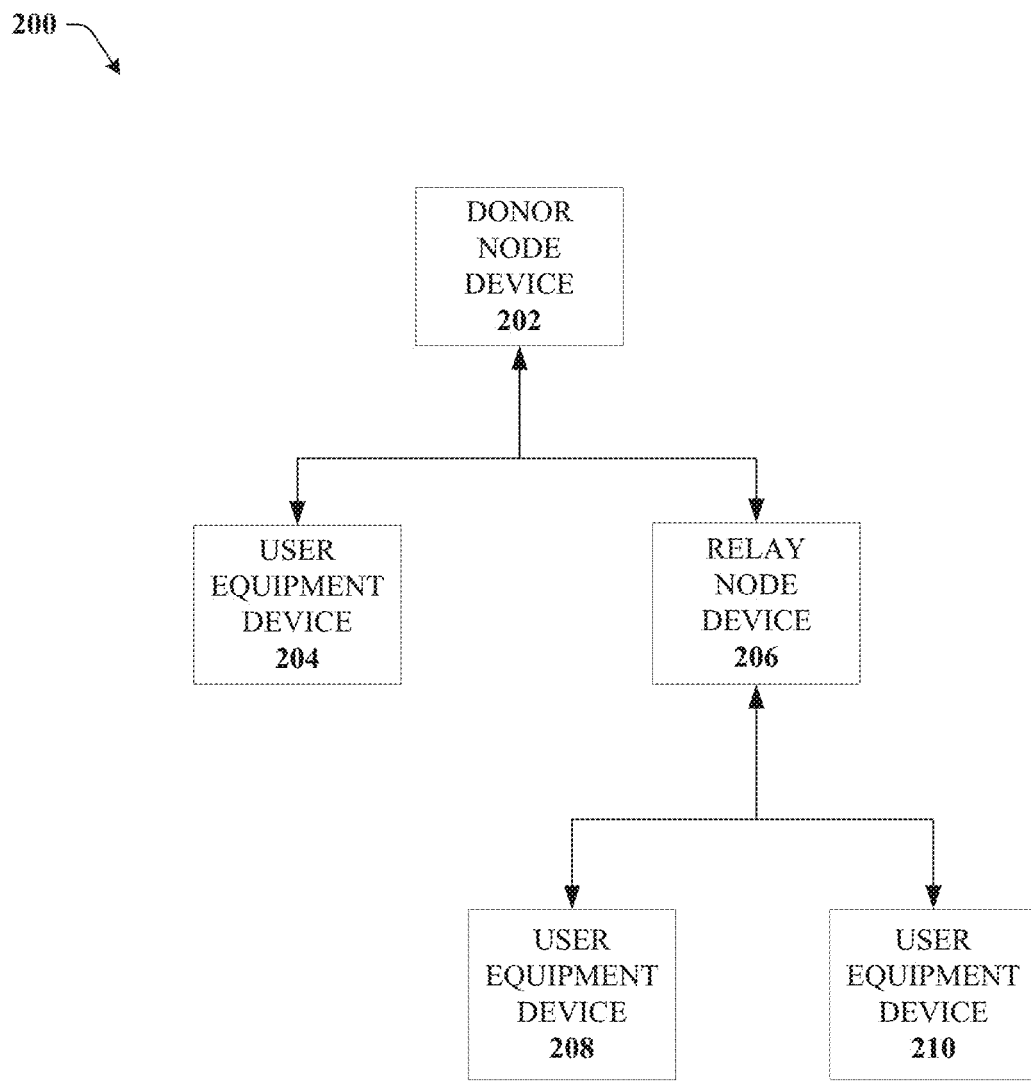
FIG. 2 illustrates an example multi-hop integrated access and backhaul network in accordance with various aspects and embodiments of the subject disclosure.

Turning now to FIG. 2, illustrated is an example multi-hop integrated access and backhaul network 200 in accordance with various embodiments disclosed herein. In integrated access and backhaul network 200, there can be a donor node device 202 that is communicably coupled to a UE device 204 and a relay node device 206 that itself communicably coupled to UE devices 208 and 210. The donor node device 202 can provide an access link directly to a user equipment device 204 or can provide a backhaul link to relay node device 206 that enables the relay node device 206 to provide access links to UE devices 208 and 210.

In an embodiment where the communication protocol associated with the IAB network is half duplex, donor node device 202 and relay node device 206 face the constraint where they can only receive or transmit during a particular time frame. Accordingly, during the time frame, donor node device 202 receives transmissions from UE device 204 at the same time as relay node device 206. Similarly, relay node device 206 receives a downlink backhaul link from donor node device 202 at the same time as it receives an uplink access link from UE devices 208 and/or 210. In an embodiment, these transmissions can be space division multiplexed or frequency division multiplexed and thus received during the same slot, and so transmissions are received at the same receiver but may have different power profiles due to the different natures of the transmitters (base station transmitter vs UE transmitter).

The donor node device 202 or the relay node device 206 can determine the power difference level based on reference signals associated with the transmissions or on the basis of the already received transmissions and if the power spectral density (PSD) difference or signal strength difference between the transmissions are high enough or above a predetermined threshold, then the donor node device 202 or relay node device 206 can perform uplink power control management to reduce the difference.

There are several different ways in which the power difference can be reduced, and the first is to ensure that if a transmission from a relay node device or donor node device is to be received by the donor node or relay node at the same time as a transmission from a user equipment device, to select a user equipment device with a higher signal strength or PSD difference. This can ensure that the instantaneous power difference between the relay node device uplink and the access UE uplink is below a predetermined threshold.

In another embodiment, the donor node device 202 can schedule the relay node device 206 to its own symbol within a time slot. With this, the relay node device 206 is the only entity transmitting uplink into the donor node device 202 during that symbol and therefore the high power levels do not impact any other access links (e.g., from UE 204). The donor node device 202 can switch reference levels for the automatic gain control when servicing UE device 204 at the different time when they are scheduled to transmit.

In other embodiment, the donor node device 202 can perform closed loop power control on the relay node device 206 for the uplink from the relay node device 206 to the donor node device 202. The donor node device 202 can indicate to the relay node device 206 that its incoming power level is too high, and then the relay node device 206 can use this feedback to reduce the transmit power to the donor node device 202 via digital backoff or analog backoff.

In an embodiment, digital power backoff on the relay node device 206 may only affect the sub-band uplink transmissions between the relay node device 206 and the donor node device 202. In this embodiment, only the power levels at certain frequencies are reduced, whereas the power levels of other transmissions, (e.g., downlink transmissions to UE device 208 and UE device 210) are not affected. With analog power backoff however, the power levels of all of the transmissions, including downlink transmissions to UE 208 and 210 will be affected and reduced, not just the uplink transmission to donor node device 202. In some embodiments, a hybrid power backoff can be used, where both analog and digital power backoffs are performed.

In an embodiment, the closed loop power control can be performed via outer-loop power control where the donor node device 202 determines a relative difference between signal strengths received from relay node device 206 and UE device 204 based on reference signals (e.g., Synchronization Signal Block (SSBlock or Channel State Information Reference Signals (CSI-RS) which are used for both Radio Resource Management (RRM) and beam management measurements) received from the UE device 204 and relay node device 206. The outer-loop power control includes the donor node device 202 informing the relay node device 206 of the relative power difference and provides a goal or operating point for the relay node device 206 to adjust a power level of the uplink transmission to the donor node device 202.

In another embodiment, the closed loop power control can be performed via inner-loop power control where the donor node device 202 provides further adjustments to the value set by the outer-loop control for the relay node device 206 to perform. Unlike the outer-loop which provides the relative value, the inner-loop power control can be an iterative step up and step down command that iteratively adjusts the power level of the uplink transmission from the relay node. Inner loop power control commands can be sent to the relay node device 206 from the donor node device 202 via a PDCCH for fast feedback. In at least one embodiment, the relay can feedback power control steps every slot along with other feedback on PDCCH such as Hybrid Automatic Repeat Request (HARQ) or Negative Acknowledgement (NACK) requests.

Figure 3:
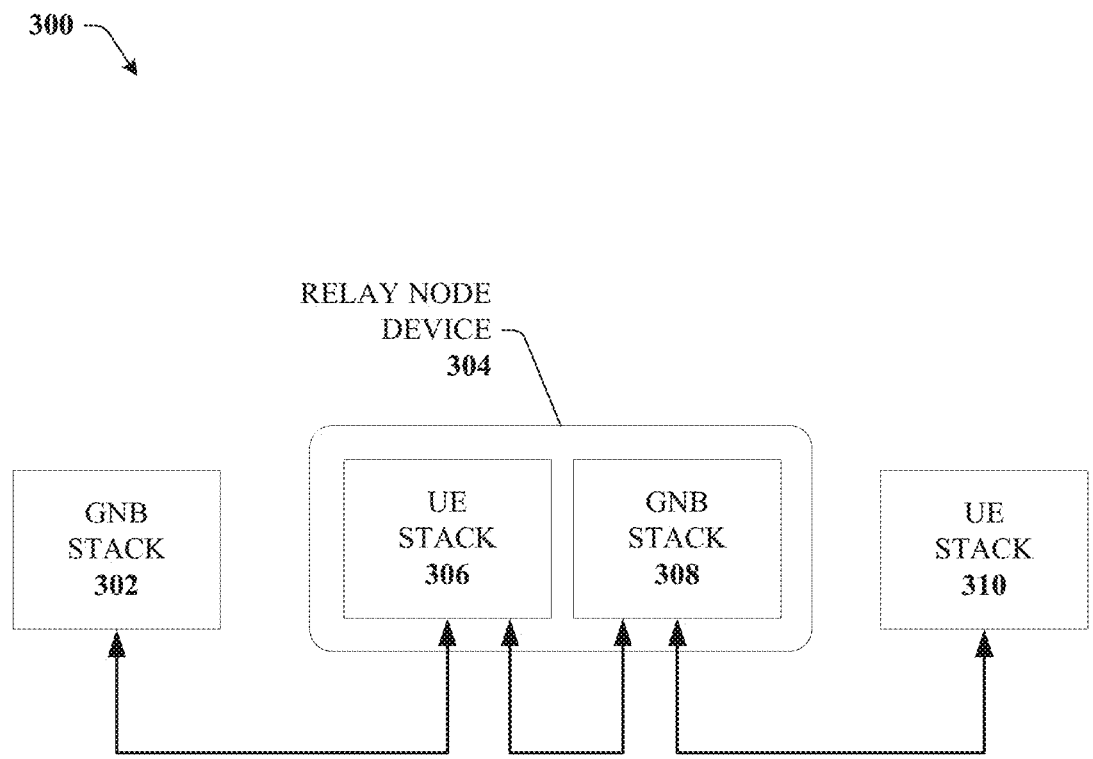
FIG. 3 illustrates an example block diagram of a relay node with user equipment and base station stacks in accordance with various aspects and embodiments of the subject disclosure.

Turning now to FIG. 3, illustrated is an example block diagram 300 of a relay node device 304 with user equipment and base station stacks in accordance with various aspects and embodiments of the subject disclosure. In an embodiment, a relay node device 304 can have separate logical functions that are collocated. A UE stack 306 or UE Function (UE-f) can establish communications with the parent node (e.g., donor node) and a GNB stack 308 (Donor function) that establishes communication with the child node or UEs. To a donor node device, the relay node device 304 appears as a UE device as the UE stack 306 recreates the functions of a UE device, and to a UE (e.g., UE stack 310), the relay node device 304 appears as a gNodeB or base station device due to the interaction with the GNB stack 308. The link between the UE stack 306 and the parent node (e.g., GNB stack 302) can be referred to as a backhaul link, while the link between the GNB stack 308 and the UE stack 310 can be referred to as an access link.

In an embodiment, even though the relay node device 304 consists of 2 logical nodes each with its own stack, the physical transceiver of the relay node device 304 is shared between them. In other words the PHY of the UE stack 306 and the PHY of the GNB stack 308 run on the same transceiver systems. The backhaul link and the access link can therefore be multiplexed in the fowling manner: 1) Time Division Multiplexing: The access link and the backhaul link are time multiplexed with each other. This implies that UE stack 306 and the GNB stack 308 are not active simultaneously; 2) Frequency Division Multiplexing (FDM): The access link and the backhaul link are active at the same time but on different frequency resources, e.g. on separate CC or on separate PRB on the same CC; 3) Space Division Multiplexing (SDM): The access link and the backhaul link are active at the same time on the same frequency resources. The spatial multiplexing can further be divided in to the two following cases: a) Intra Panel SDM: The access and backhaul use the same panel but different spatial layers; b) Inter Panel SDM: The access and backhaul use different panels. In an embodiment, the power control management system disclosed herein can apply when the UE stack and GNB stack are using FDM or SDM as the resources may overlap with each other in time, and reducing the power differences can improve AGC and overall throughput.

Due to the half-duplex constraint at each relay node it can transmit or receive at any given instance but not both. The UE stack 306 can be in receive mode during a backhaul DL allocation and in transmit mode during a backhaul UL allocation. Similarly the GNB stack 308 is in receive mode during an access UL allocation and in transmit mode during an access DL allocation.

Figure 4:
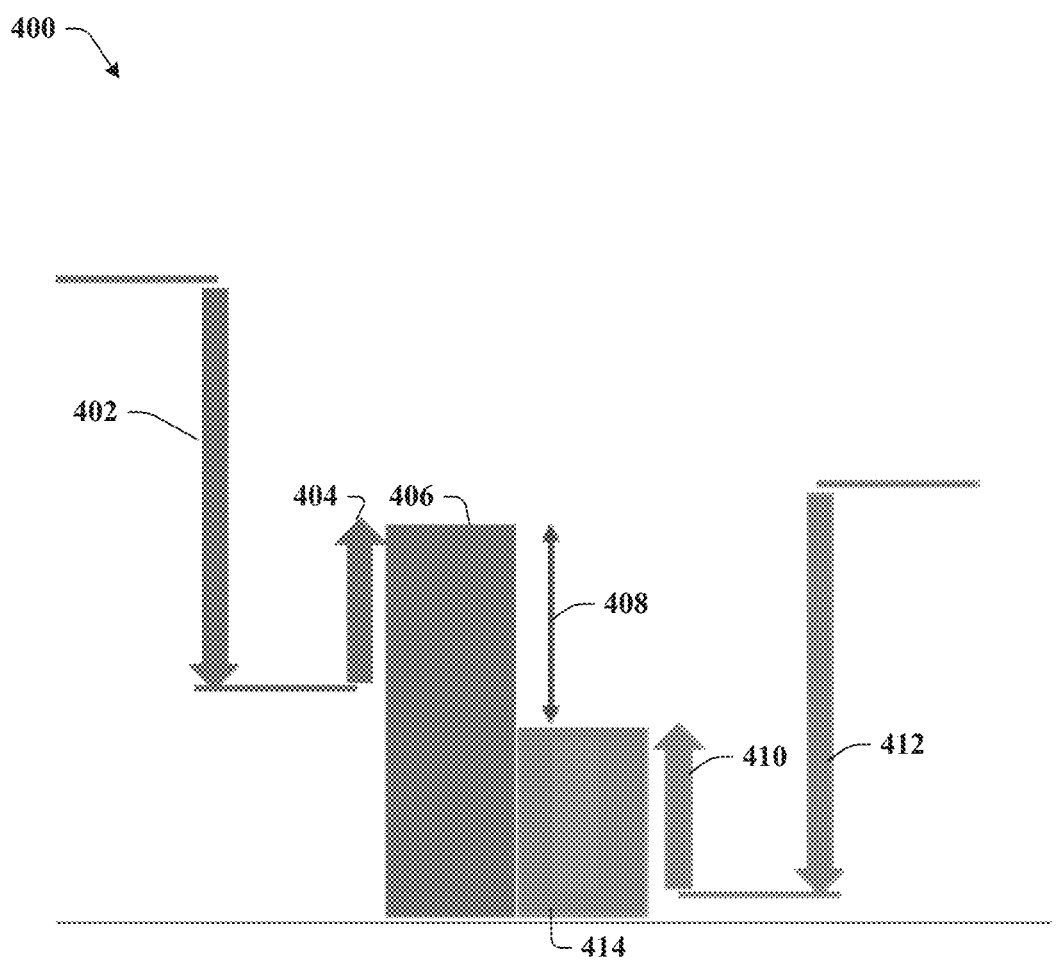
FIG. 4 illustrates an example graph showing power spectral density differences at a donor node receiver for backhaul and access link communications in accordance with various aspects and embodiments of the subject disclosure.

Turning now to FIG. 4, illustrated is an example graph 400 showing power spectral density differences at a donor node receiver for backhaul and access link communications in accordance with various aspects and embodiments of the subject disclosure.

In an embodiment, the vertical axis of the graph 400 can be the power spectral density axis. An uplink transmission from a relay node (e.g., relay node device 206) can have a power spectral density of 406 and a UE device can have an uplink transmission that has a power spectral density of 414. The initial PSD of the backhaul link from the relay node device can be higher, but then suffer coupling losses 402 and then have an increase from the receiver gain. Similarly, the initial PSD of the access link can be higher, suffer coupling loss 412, and then have a receiver gain of 410 to achieve the PSD 414. The difference between the PSDs is 408, which may be above a difference threshold that can initiate the power control management disclosed herein.

As the relay node and donor node are multiplexing a DL and UL across access links and backhaul links power control can be important. In 5G/NR, the transmit and receive power levels of DL channels and UL channels can be very different. For example when the PHY is in receive mode then it can receive the backhaul DL transmission and the access UL transmission at the same time. These two could be FDM or SDM. However in an embodiment, the DL backhaul transmission is performed by the DU-f of the parent node whereas the UL access transmission is performed by a UE-f of a child node or a UE. Therefore the EIRP of a DL transmission from a base station is typically much higher than the Equivalent Isotropically Radiated Power (EIRP) of the UL transmission which can be from a user equipment device. Moreover in 5G/NR the UL transmissions are power controlled whereas DL transmissions are not. This can imply that the backhaul DL and access UL will arrive at the receiver at very different levels as shown in FIG. 4.

If the hardware is shared between the UE-f and DU-f (e.g. same panel or same RF chain) then such a receiver PSD difference can cause significant problem. The higher PSD of the DL backhaul will likely set the Automatic Gain Control (AGC) which can mean that the UL access signal will fall well below the level set by AGC, which may impact the SINR and therefore the overall throughput of the access transmission. In order to support FDM and SDM using the same RF chain (e.g. intra panel) the power control management technique disclosed herein can enhance the power control mechanism for IAB.

Figure 5:
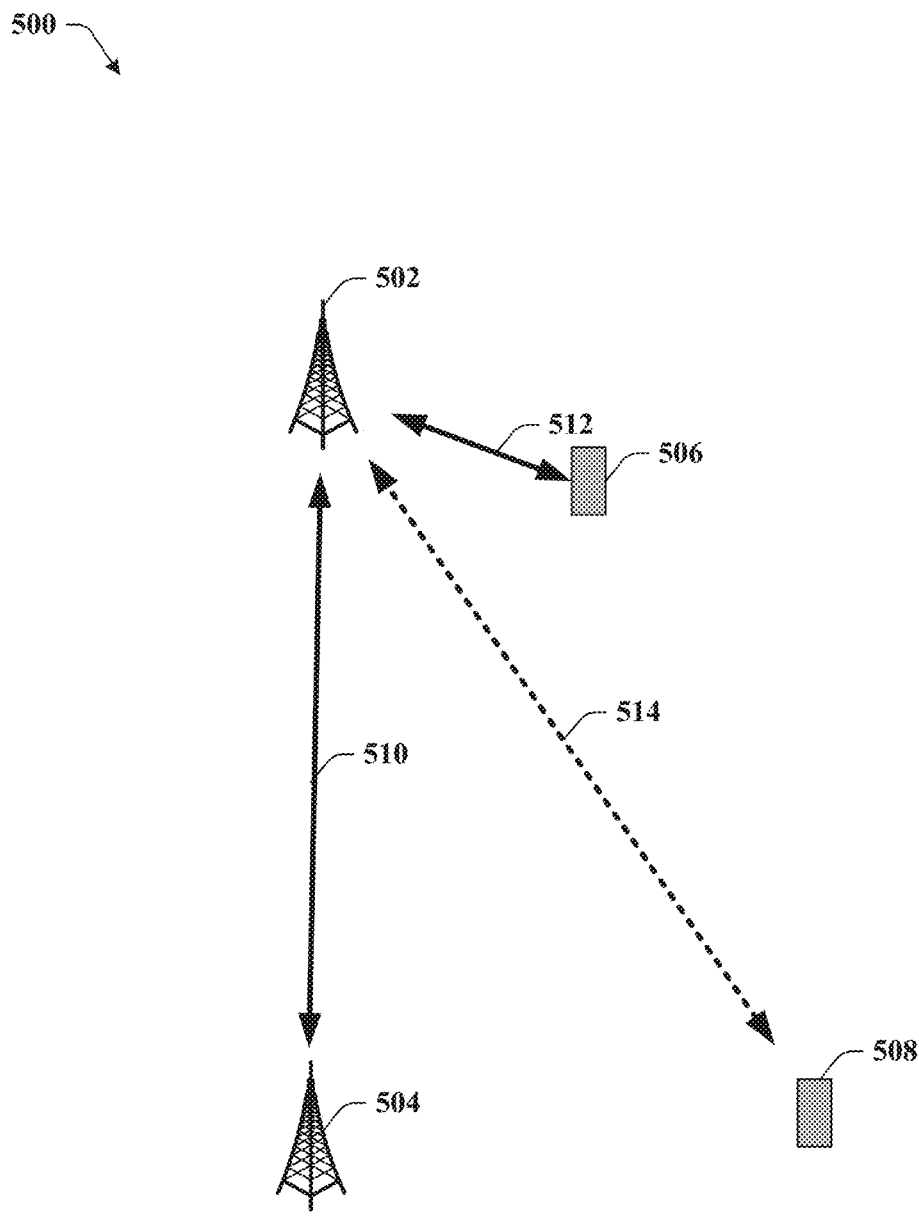
FIG. 5 illustrates an example block diagram of a donor node and relay node that manage power levels in accordance with various aspects and embodiments of the subject disclosure.

Turning now to FIG. 5, illustrated is an example block diagram 500 of a donor node and relay node that manage power levels in accordance with various aspects and embodiments of the subject disclosure.

In an embodiment, a donor node 502 can be communicably coupled to a relay node 504, and UE devices 506 and 508. Based on reference signals (SSBlock or CSI-RS), the donor node device 502 can determine a PSD or signal strength of the communication link 510 with relay node 504 as well as communications links 512 and 514 with UE 506 and 508 respectively. If the difference in PSD between the communications links is larger than a defined level, then the donor node 502 can initiate the power control management to reduce the power difference.

As an example, if the PSD difference between communication link 514 and communication link 510 is larger than the defined level, but the communication link 510 and communication link 512 have a PSD below the defined level, then the donor node 502 can schedule relay node 504 to transmit an uplink communication at the same time as UE device 506. UE device 506 can be closer to donor node device 502 than UE device 508 and so can have a larger PSD or EIRP as determined by the donor node device 502. In other embodiments, donor node device can use the location of the devices to select which devices are scheduled at the same time. For instance, if a relay node device (e.g., relay 504) is to be scheduled at the same time as a UE device, then the donor node device 502 can select a UE device within a predetermined range, as the closer UEs are likely to have a higher PSD.

Figure 6:
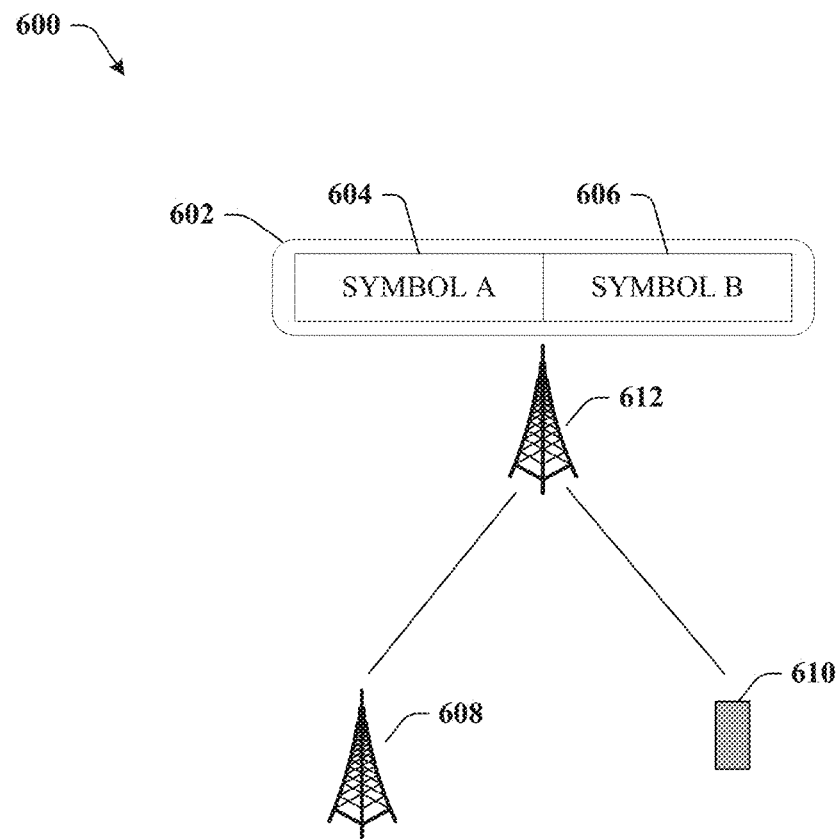
FIG. 6 illustrates an example block diagram of a donor node device that schedules devices with different power levels to different symbols in a time slot in accordance with various aspects and embodiments of the subject disclosure.

In an embodiment, if there are no suitable UE devices that have a high enough PSD to schedule at the same time as relay node 504, the donor node 502 and or relay node 504 can use a different method in order to provide power control management. In an embodiment shown in FIG. 6, donor node 612 can schedule a first symbol A 604 from a relay node 608 to a time slot 602 that is different than a second symbol B 606 from UE device 610. The donor node 6012 can simply switch reference levels relating to the AGC when servicing other normal UE UL (e.g., UE 610 at the different time when they are scheduled to transmit.

In other embodiments, the donor node 502 can perform closed loop power control on the relay node 504 UL. The donor node 502 can indicate to the relay node 504 that its incoming power level is too high. The relay node 504 can use this feedback to reduce its transmit power to the donor node 502 via digital backoff or analog power backoff. Digital power backoff on the relay node 504 would only affect the sub-band UL transmissions between the relay node 504 and donor node 502, whereas analog power backoff would impact the DL transmission between the relay gnB and its users. A combination of the two approaches may be used to perform a hybrid power backoff.

The signaling of the closed loop power control from the relay node 504 to the donor node 502 node can comprise of the following two components.

Outer loop power control: The outer loop of the UL power control sets the operating point and can be specified as a relative value with respect to a reference signal such as SSBlock or CSI-RS which are used for both RRM and beam management measurements. The outer-loop power control messages is not send every slot and therefore can be sent using something like the MAC-CE (MAC control element)

Inner loop power control: The inner loop power control provides further adjustments to the value set by the outer loop. Unlike the outer-loop which can provide the relative value, the inner loop can be a step up and step down command Inner loop power control command can be sent via the PDCCH for fast feedback. Potentially the relay could feedback power control steps every slot along with other feedback on PDCCH such as HARQ ACK/NACK.

Figure 7:
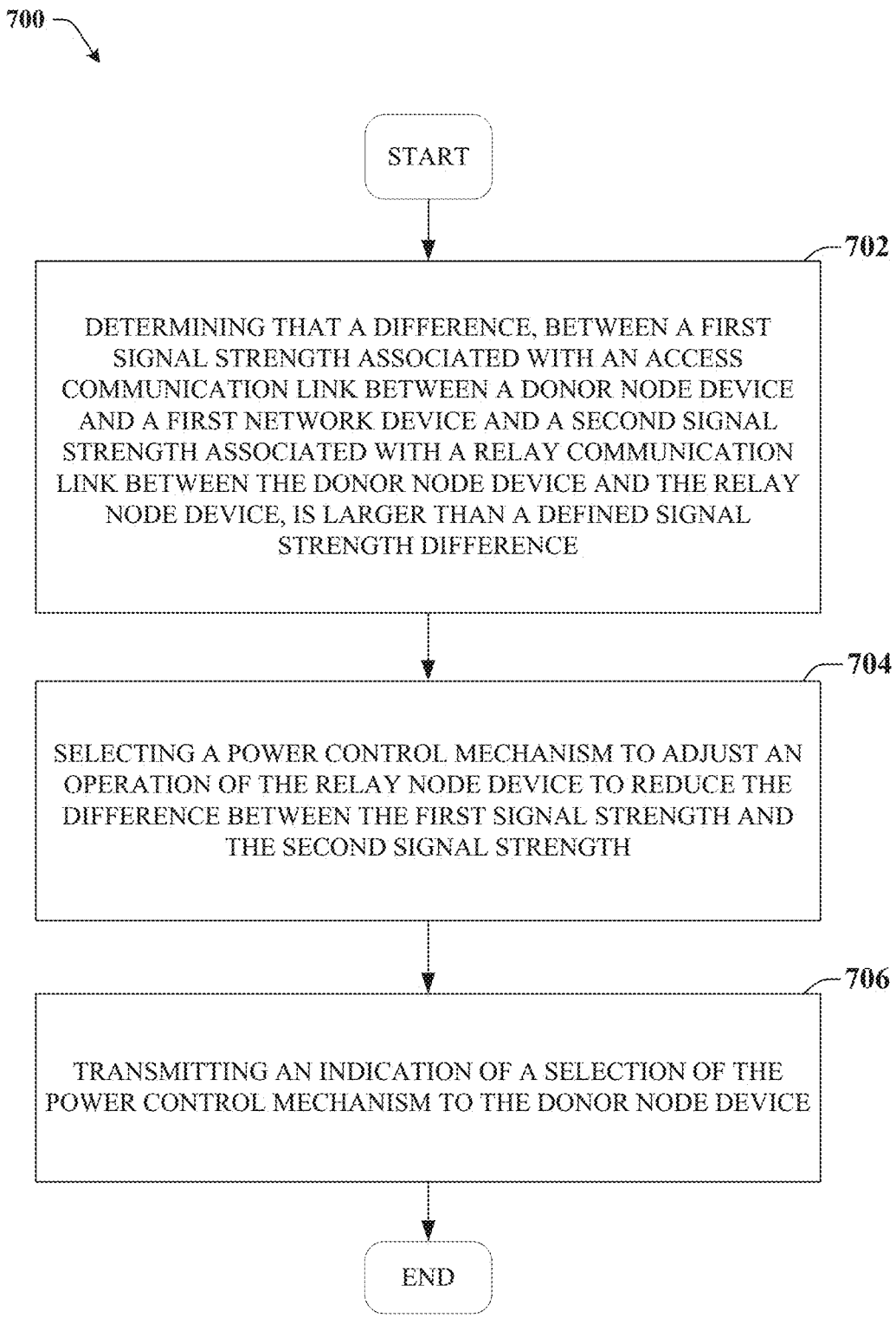
FIG. 7 illustrates an example method for managing power levels in a multi-hop integrated access and backhaul network in accordance with various aspects and embodiments of the subject disclosure.
Figure 8:
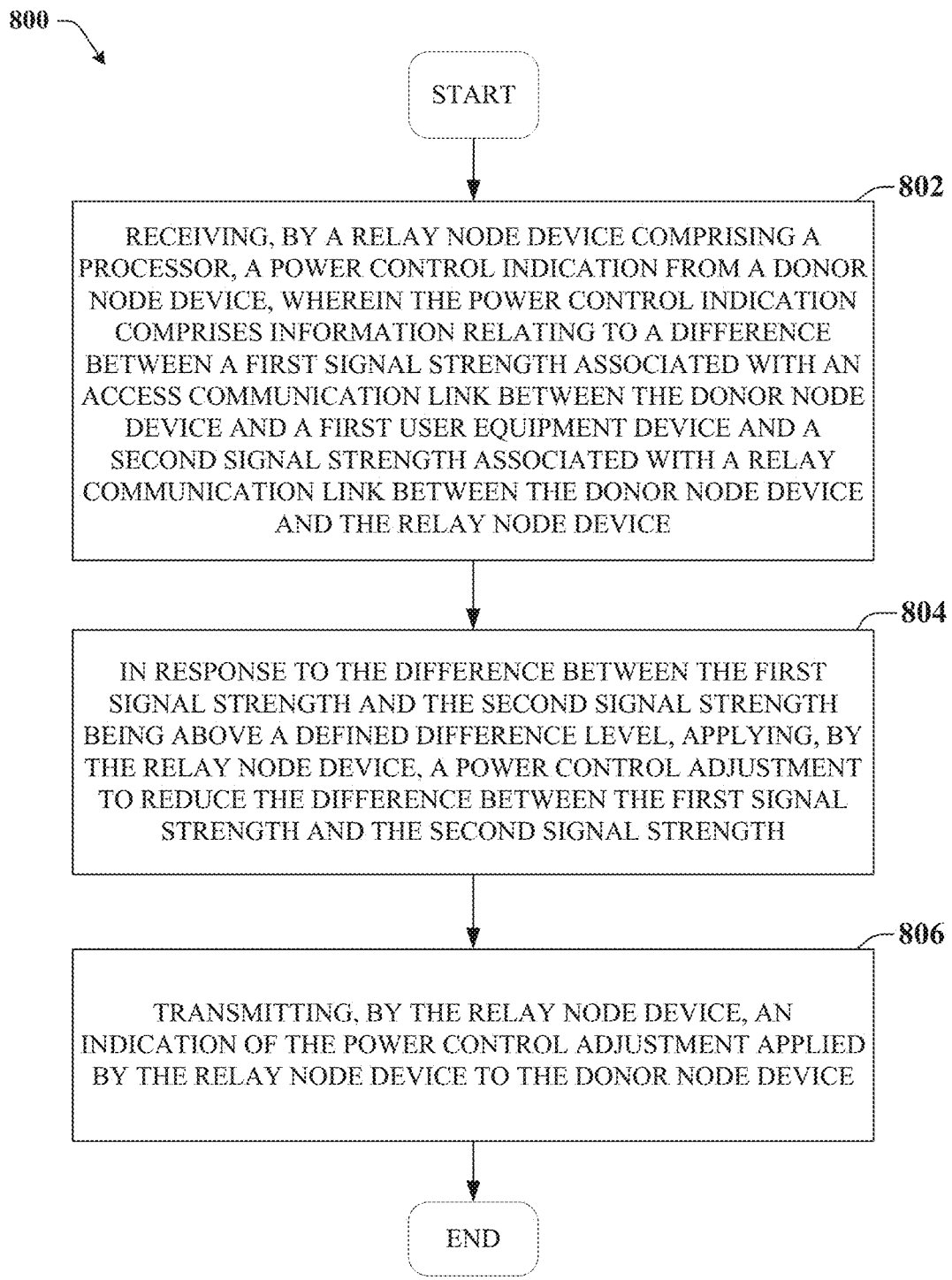
FIG. 8 illustrates an example method for managing power levels in a multi-hop integrated access and backhaul network in accordance with various aspects and embodiments of the subject disclosure.

Within relay node, the relay node 504 and donor node 502 can coordinate the actual transmission power to not exceed the maximal allowed PSD. As the transmission power of relay node 504 follows the power control procedure, the final determined relay node 504 transmission power must be informed to the donor node 502. Correspondingly, the donor node 502 transmission power can be adjusted accordingly FIGS. 7-8 illustrates a process in connection with the aforementioned systems. The processes in FIGS. 7-8 can be implemented for example by the systems in FIGS. 1-6 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 illustrates an example method 700 for managing power levels in a multi-hop integrated access and backhaul network in accordance with various aspects and embodiments of the subject disclosure.

Method 700 can begin at 702 where the method includes determining that a difference, between a first signal strength associated with an access communication link between a donor node device and a first network device and a second signal strength associated with a relay communication link between the donor node device and the relay node device, is larger than a defined signal strength difference.

At 704, the method includes selecting a power control mechanism to adjust an operation of the relay node device to reduce the difference between the first signal strength and the second signal strength.

At 706, the method includes transmitting an indication of a selection of the power control mechanism to the donor node device.

FIG. 8 illustrates an example method 800 for managing power levels in a multi-hop integrated access and backhaul network in accordance with various aspects and embodiments of the subject disclosure.

Method 800 can begin at 802 where the method includes receiving, by a relay node device comprising a processor, a power control indication from a donor node device, wherein the power control indication comprises information relating to a difference between a first signal strength associated with an access communication link between the donor node device and a first user equipment device and a second signal strength associated with a relay communication link between the donor node device and the relay node device.

At 804, the method includes in response to the difference between the first signal strength and the second signal strength being above a defined difference level, applying, by the relay node device, a power control adjustment to reduce the difference between the first signal strength and the second signal strength.

At 806, the method includes transmitting, by the relay node device, an indication of the power control adjustment applied by the relay node device to the donor node device.

Figure 9:
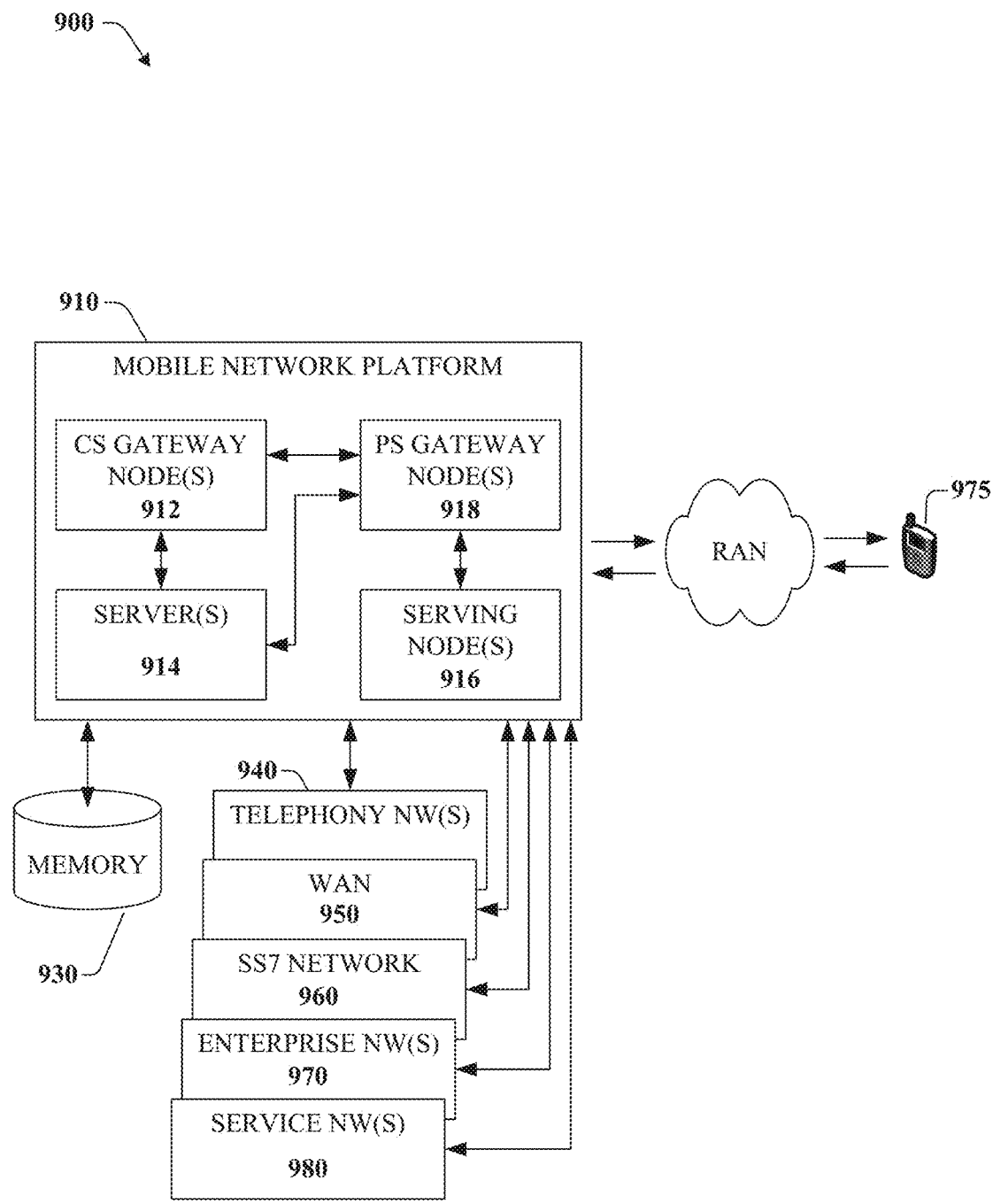
FIG. 9 illustrates an example block diagram of a non-limiting embodiment of a mobile network platform in accordance with various aspects described herein.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 960. Circuit switched gateway node(s) 912 can authorize and authenticate traffic (e.g., voice) arising from such networks. Additionally, CS gateway node(s) 912 can access mobility, or roaming, data generated through SS7 network 960; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication. Mobile network platform 910 can also include the MMEs, HSS/PCRFs, SGWs, and PGWs disclosed herein.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 960 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 960, or SS7 network 970. In an aspect, memory 930 can be, for example, accessed as part of a data store component or as a remotely connected memory store.

Figure 10:
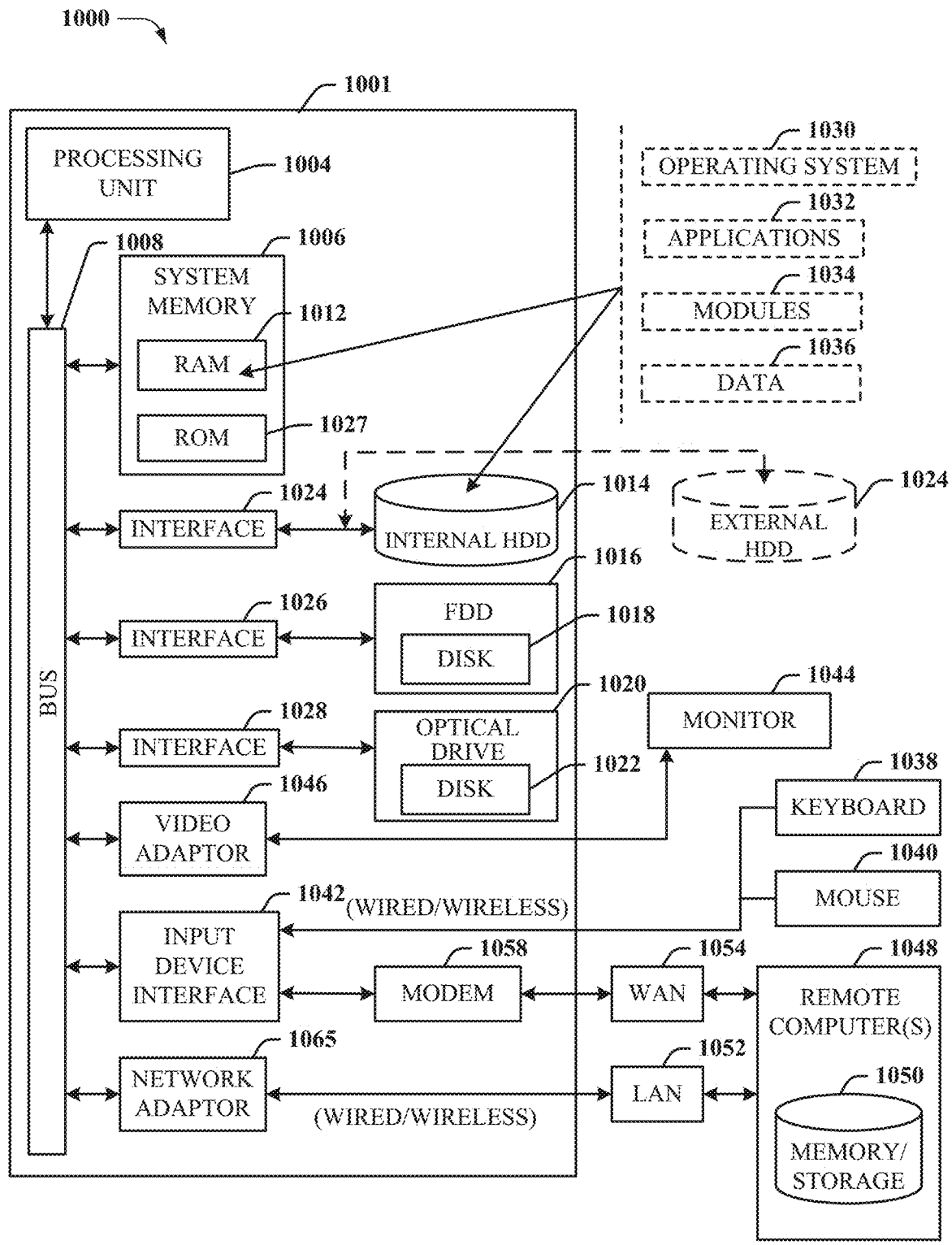
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 106, donor node 202, relay node 206, e.g.) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring now to FIG. 10, there is illustrated a block diagram of a computer 1000 operable to execute the functions and operations performed in the described example embodiments. For example, a network node (e.g., network node 106, gNB 202, e.g.) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. First network equipment, comprising:
    a processor; and
    a memory that stores executable instructions that, when executed by the processor, facilitate performance of operations, the operations comprising:
        determining a first difference between a first signal strength of a first signal and a second signal strength of a second signal, wherein the first signal has been transmitted by a user equipment to a second network equipment, and wherein the second signal has been transmitted by the first network equipment to the second network equipment; and
        in response to the first difference between the first signal strength of the first signal that has been transmitted by the user equipment and the second signal strength of the second signal that has been transmitted by the first network equipment being determined to be greater than a defined signal strength difference, decreasing a transmission power of the first network equipment to facilitate a reduction of a second difference between respective signal strengths of a third signal that has been transmitted by the user equipment to the second network equipment and a fourth signal that has been transmitted by the first network equipment to the second network equipment, wherein the decreasing the transmission power of the first network equipment comprises:
            based on an attenuation, via an automatic gain control, of a gain of a receiver of the second network equipment according to the second signal strength of the second signal that has been transmitted by the first network equipment, decreasing the transmission power of the first network equipment to facilitate the reduction of the second difference between the respective signal strengths of the third signal and the fourth signal.

2. The first network equipment of claim 1, wherein the third signal has been transmitted to the second network equipment while the fourth signal has been transmitted to the second network equipment.

3. The first network equipment of claim 1, wherein the determining the first difference between the first signal strength and the second signal strength comprises:
    receiving, from the second network equipment, an indication of the first difference via a downlink control channel.

4. The first network equipment of claim 3, wherein receiving the indication of the first difference comprises:
    periodically receiving, from the second network equipment via negative acknowledgement requests, commands to iteratively modify the transmission power of the first network equipment.

5. The first network equipment of claim 3, wherein the first difference has been determined by the second network equipment based on respective channel state information reference signals that have been received from the first network equipment and the user equipment.

6. The first network equipment of claim 1, wherein the user equipment is a first user equipment, and wherein the operations further comprise:
    in response to the first difference between the first signal strength of the first signal that has been transmitted by the first user equipment and the second signal strength of the second signal that has been transmitted by the first network equipment being determined to be greater than the defined signal strength difference, adjusting a first transmission time of the first network equipment to match a second transmission time of a second user equipment to facilitate respective detections, by the second network equipment, of user equipment transmissions of the second user equipment.

7. The first network equipment of claim 1, wherein the user equipment is a first user equipment, and wherein the operations further comprise:
    in response to the second difference between the respective signal strengths being determined to be greater than the defined signal strength difference, scheduling, during a first transmission period, a first transmission of a first symbol from the first network equipment to the second network equipment, wherein a second transmission of a second symbol from the second user equipment has been scheduled during a second transmission period that does not overlap in time with the first transmission period.

8. The first network equipment of claim 7, wherein a first reference level of the automatic gain control corresponding to the receiver of the second network equipment is scheduled to be utilized during the first transmission of the first symbol from the first network equipment to the second network equipment, and wherein a second reference level of the automatic gain control, different from the first reference level, is scheduled to be utilized during the second transmission of the second symbol from the second user equipment to the second network equipment.

9. A method, comprising:
determining, by a first network equipment comprising a processor, a first signal strength of a first signal that has received by the first network equipment from a user equipment via a first communication link between the first network equipment and the user equipment;
determining, by the first network equipment, a second signal strength of a second signal that has been received from a second network equipment via a second communication link between the first network equipment and the second network equipment; and
in response to a difference between the first signal strength and the second signal strength being determined to be greater than a defined signal strength difference, sending, by the first network equipment, an indication of the difference to the second network equipment to facilitate a first reduction of a transmission power of the second network equipment and to further facilitate a second reduction in the difference between respective signal strengths of respective signals that have been transmitted by the user equipment and the second network equipment, wherein the sending the indication of the difference to the second network equipment further comprises:
facilitating the second reduction in the difference between the respective signal strengths of the respective signals that have been transmitted by the user equipment and the second network equipment to account for an attenuation, via an automatic gain control, of a gain of a receiver of the first network equipment due to a fourth signal strength of the respective signal strengths corresponding to the second network equipment being greater than a third signal strength of the respective signal strengths corresponding to the user equipment.

10. The method of claim 9, wherein the first signal has been received from the user equipment during a period in which the second signal has been received from the second network equipment.

11. The method of claim 9, wherein the sending the indication of the difference to the second network equipment further comprises:
sending, via a downlink control channel, the indication of the difference to the second network equipment.

12. The method of claim 9, wherein the sending the indication of the difference to the second network equipment further comprises:
periodically sending, via negative acknowledgement requests, commands directing the second network equipment to iteratively modify the transmission power of the second network equipment.

13. The method of claim 9, wherein the determining the first signal strength of the first signal comprises:
determining the first signal strength via channel state information reference signals that have been received from the user equipment.

14. The method of claim 13, wherein the channel state information reference signals are first channel state information reference signals, and wherein the determining the second signal strength of the second signal comprises:
determining the second signal strength via second channel state information reference signals that have been received from the second network equipment.

15. The method of claim 9, further comprising:
based on a first defined reference level corresponding to the automatic gain control of the receiver of the first network equipment, receiving, by the first network equipment during a first transmission period, the first signal from the user equipment; and
based on a second defined reference level corresponding to the automatic gain control of the receiver of the first network equipment, receiving, by the first network equipment during a second transmission period that does not overlap the first transmission period, the second signal from the second network equipment.

16. A non-transitory machine-readable medium, comprising executable instructions that, when executed by a processor of a relay equipment, facilitate performance of operations, the operations comprising:
determining a first difference between a first power spectral density of a first signal that has been received, by a donor equipment, from a user equipment and a second power spectral density of a second signal that has been received, by the donor equipment, from the relay equipment; and
in response to the difference being determined to be larger than a defined spectral density difference representing a reduction in detection, by the donor equipment, of signals transmitted by the user equipment, reducing a transmission power of the relay equipment to facilitate a reduction of a second difference between respective power spectral densities of respective signals transmitted by the relay equipment and the user equipment, wherein the reduction in detection of the signals transmitted by the user equipment corresponds to an attenuation, based on the second power spectral density of the second signal via an automatic gain control, of a gain of a receiver of the donor equipment.

17. The non-transitory machine-readable medium of claim 16, wherein the operations further comprise:
transmitting an indication of a reduction of the transmission power of the relay equipment to the donor equipment.

18. The non-transitory machine-readable medium of claim 16, wherein the first signal has been received from the user equipment during a period in which the second signal has been received from the relay equipment.

19. The non-transitory machine-readable medium of claim 16, wherein the reducing is facilitated by sending, via a downlink control channel, an indication of the difference to the relay equipment.

20. The non-transitory machine-readable medium of claim 16, wherein determining the first power spectral density of the first signal comprises:
determining the first power spectral density via channel state information reference signals that have been received from the user equipment.

* * * * *